United States Patent Office 3,646,137
Patented Feb. 29, 1972

3,646,137
SUBSTITUTED TOLUIDIDES AND COMPOSITIONS CONTAINING THEM
Charles L. M. Brown, Epsom, England, assignor to Wigglesworth Limited, Westhoughton, England
No Drawing. Original application June 20, 1966, Ser. No. 558,626, now Patent No. 3,544,587, dated Dec. 1, 1970. Divided and this application May 21, 1970, Ser. No. 39,548
Int. Cl. C07c $103/44$
U.S. Cl. 260—557 R    9 Claims

ABSTRACT OF THE DISCLOSURE

This invention relates to a class of aminopropionyl-o-toluidides and their acid addition salts which are useful as local anaesthetics. The toluidides have the general formula:

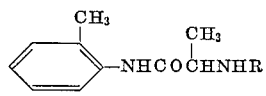

in which R represents a cycloalkyl ring which may have alkyl substituents and which contains a total of 3 to 5 carbon atoms in the ring.

---

This invention is a division of my prior application Ser. No. 558,626 filed June 20, 1966, which has now matured into U.S. Letters Pat. 3,544,587 issued Dec. 1, 1970.

BACKGROUND OF THE INVENTION

This invention relates to substituted toluidides and is especially concerned with clinically useful cyclo-alkyl-amino-acyl aniline compounds having local anaesthetic properties. The invention also relates to pharmaceutical preparations containing these compounds.

Alkylamino-acyl toluidides possess local anaesthetic properties to a greater or lesser extent, but many of these toluidides also have undesirable side effects, such for example as strong local irritation and poor incidence of anaesthesia, whether the methyl group is in the ortho-meta- or para-position. Their clinical use is therefore prevented. A limited group of these toluidides, namely the α-monoalkyl derivatives of aminopropionyl-o-toluidine in which the alkyl group does not have more than four carbon atoms, do have useful pharmacological properties, however, which are substantially free from side effects in the dosage amounts used.

We have now found in accordance with the invention that certain cyclo-alkyl derivatives of aminopropionyl-o-toluidine also have useful pharmacological properties substantially without undesirable side effects. These cyclo-alkyl derivatives which are aminopropionyl-o-toluidides can be represented by the general formula:

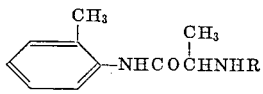

in which R represents a cycloalkyl ring which may have alkyl substituents and which contains 3 to 5 carbon atoms in the ring.

These substituted toluidide compounds can be prepared by reacting the intermediate α-halo-propio-o-toluidide with an amine compound having the general formula H$_2$NR in which R is as above. The intermediate in its turn can be prepared by reacting o-toluidine and an α-halo-propionyl halide. Preferably the bromine containing compound is the halogen compound used but this is not essential.

The substituted toluidides in accordance with the invention can be prepared and administered in the form of a physiologically acceptable acid addition salt, e.g. their hydrochlorides. They can, however, be combined with other acids, both organic and inorganic, for example, sulphuric acid, phosphoric acid, acetic acid, phenylacetic acid, benzoic acid, lactic acid, succinic acid, citric acid, tartaric acid, fumaric acid, malonic acid and malic acid, to give physiologically acceptable salts.

The substituted toluidide compounds may be mixed with an inert pharmaceutically acceptable diluent or diluents to give compositions for medical, dental or veterinary administration. These compositions may also contain other pharmaceutically and pharmacologically compatible active ingredients which are chemically inert to the compounds in accordance with the invention if required. Normally the compounds will be injected in the form of an injectable solution.

It has been found that the cyclo-pentylamine derivative in which —NHR represents:

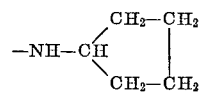

has greater anaesthetic effect than lignocaine. Also the cyclo-propylamine derivative in which —NHR represents:

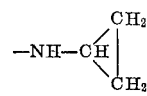

gave a shorter duration of anaesthesia than lignocaine but had only half the toxicity (LD$_{50}$ in mice). No irritation was observed for any of the compounds in accordance with the invention in concentrations up to 5% by Draize's method.

SPECIFIC EXAMPLES OF THE INVENTION

The following examples illustrate the preparation of compounds in accordance with the invention.

EXAMPLE 1

α-(Cyclopentylamino)-propio-o-toluidide o-Toluidine (107 g., 1 mole) was dissolved in glacial acetic acid (800 ml.) and cooled to a temperature of 10° C. α-Bromo-propionyl-bromide (238 g., 1.1 moles) was added to the solution and the mixture was stirred for about 1 minute. Then a solution of sodium acetate (330 g. of CH$_3$COONa.3H$_2$O made to a solution of 1½ litres) was added and the mixture was stirred for another 30 minutes. A precipitate was formed which was filtered off, washed with water and dried. The intermediate α-bromo-propio-o-toluidide was obtained with a yield of 77% by weight and it had a melting point of 131 to 132° C.

Next the α-bromo-propio-o-toluidide (1 mole) and cyclopentylamine (2.2 moles) were dissolved in dry benzene and refluxed for 8 hours. After cooling the mixture was diluted with dry ether and the precipitated cyclopentylamine hydrobromide was filtered off. The filtrate was extracted with 4N HCl until the extract no longer showed opacity with ammonia. The aqueous extract was then alkalised with concentrated ammonia the free base formed was extracted with ether and the ethereal extract was dried over anhydrous sodium sulphate After evaporating off the ether the residue was distilled at a temperature of 162° C. under 0.3 mm. of mercury to give α-(cyclopentylamino)-propio-o-toluidide a yield of 72.5% by weight.

*Analysis.*—Required for C$_{15}$H$_{22}$N$_2$O (percent): C, 73.14; H, 9.00; N, 11.38; O, 6.49. Found (percent): C, 73.56; H, 9.21; H, 11.8; O, 6.15.

EXAMPLE 2

α-(Cyclopropylamino)-propio-o-toluidide

α-Bromo-propio-o-toluidide (1 mole) and cyclopropylamine (2.2 moles) were dissolved in benzene in a well corked round bottomed flask and heated at a temperature of 80° C. on a water bath for 8 hours. After cooling the flask was opened and the contents worked up as described in Example 1.

α-(Cyclopropylamine)-propio-o-toluidide was obtained with a yield of 77% by weight. It was a soft waxy solid with a characteristic odour and a melting point of 62° C.

*Analysis.*—Required for $C_{13}H_{18}N_2O$ (percent): C, 71.52; H, 8.31; N, 12.83; O, 7.33. Found (percent): C, 71.99; H, 8.34; N, 12.35; O, 7.32.

The hydrochlorides of the derivatives prepared in the preceding Examples were prepared by conventional reactions and give the following results:

| Hydrochloride of— | Yield (percent by weight) | Melting point [1] (° C.) |
|---|---|---|
| α-(cyclopentylamino)-propio-o-toluidide | 98.5 | 238–240 |
| α-(cyclopropylamino)-propio-o-toluidide | 85.3 | 189 |

[1] Decomposition.

Both hydrochlorides were faintly coloured as prepared but were obtained as colourless crystals by recrystallisation from aqueous acetone.

The following Tables I, II, and III, summarise the results of pharmacological tests carried out with examples of compounds in accordance with the invention and compares them with lignocaine.

TABLE I

| Compound—NHR represents— | Intravenous toxicity [1] | Subcutaneous toxicity [1] | Irritation (Draize's method) | Threshold irritant concentration,[2] percent | Relative durations of anaesthesia |
|---|---|---|---|---|---|
| Control: Lignocaine | 35 | 360 | 0 | 4 | 1.0 |
| CH₂—CH₂<br>\<br>CH—NH<br>/<br>CH₂—CH₂ | <10 | | 0 | | 4.0 |
| CH₂<br>\<br>CH—NH—<br>/<br>CH₂ | 70 | 990 | 0 | 2 | 0.5 |

[1] Mg./kg. body weight.
[2] Hoppe's Trypan Blue method.

TABLE II

| Compound —NHR represents— | Time in minutes [1] | |
|---|---|---|
| | 2% w./v. | 1% w./v. |
| Control: Lignocaine | 8.7 | 10.7 |
| CH₂<br>\<br>CH—NH—<br>/<br>CH₂ | 7.0 | 15.0 |

[1] For onset of anaesthesia by conduction (Frog Plexus method).

TABLE III
Relationship between percent concentration and time to reach 50% anaesthesia

| Compound —NHR represents— | Percent concentration (w./v.) | Time of 50% anaesthesia (minutes) |
|---|---|---|
| Control: Lignocaine | 1.0 | 25 |
| | 2.0 | 40 |
| | 3.0 | 63 |
| CH₂<br>\<br>CH—NH—<br>/<br>CH₂ | 1.0 | 14 |
| | 2.0 | 22 |
| | 6.0 | [1] 105 |

[1] Estimated.

It will be seen from these tables that the compounds in accordance with the invention are at least as effective an anaesthetic as lignocaine and in many respects are much better.

I claim:

1. An aminopropionyl-o-toluidide having the formula:

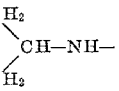

in which R represents a cycloalkyl ring which contains from 3 to 5 carbon atoms in the ring.

2. α-(Cyclopentylamino)-propio-o-toluidide.

3. α-(Cyclopropylamino)-propio-o-toluidide.

4. A physiologically acceptable acid addition salt of an aminopropionyl-o-toluidide as claimed in claim 1.

5. A physiologically acceptable acid addition salt of the α-(cyclopentylamino)-propio-o-toluidide claimed in claim 2.

6. A physiologically acceptable acid addition salt of the α-(cyclopropylamino)-propio-o-toluidide claimed in claim 3.

7. A salt as claimed in claim 4 which is the hydrochloride salt.

8. The hydrochloric acid addition salt of the α-(cyclopentylamino)-propio-o-toluidide claimed in claim 2.

9. The hydrochloric acid addition salt of the α-(cyclopropylamine)-propio-o-toluidide claimed in claim 3

References Cited

FOREIGN PATENTS 1,494,815  8/1967  France ............. 260—557

HENRY R. JILES, Primary Examiner

H. I. MOATZ, Assistant Examiner

U.S. Cl. X.R.

424—324